United States Patent [19]

Strauss et al.

[11] Patent Number: 5,583,301
[45] Date of Patent: Dec. 10, 1996

[54] ULTRASOUND AIR VELOCITY DETECTOR FOR HVAC DUCTS AND METHOD THEREFOR

[75] Inventors: Jason Strauss, Fort Lauderdale, Fla.; Harvey Weinberg, Montreal; Zev Kopel, Dollard Des Ormeaux, both of Canada

[73] Assignee: National Environmental Products Ltd., Inc., Canada

[21] Appl. No.: 336,835

[22] Filed: Nov. 9, 1994

[51] Int. Cl.[6] ........................................ G01F 1/66
[52] U.S. Cl. ........................................ 73/861.29
[58] Field of Search ................... 73/861.25, 861.26, 73/861.27, 861.29

[56] References Cited

U.S. PATENT DOCUMENTS

| | | | |
|---|---|---|---|
| 4,334,434 | 6/1982 | Appel et al. | 73/861.29 |
| 4,425,805 | 1/1984 | Ogura et al. | 73/861.25 |
| 4,438,652 | 3/1984 | Saito | 73/861.25 |
| 4,493,216 | 1/1985 | Hassler | 73/861.25 |
| 4,519,260 | 5/1985 | Fu et al. | 73/861.25 |
| 4,611,496 | 9/1986 | Kamachi | 73/861.27 |
| 4,823,612 | 4/1989 | Ichino | 73/861.18 |
| 4,922,750 | 5/1990 | Magori | 73/118.2 |
| 5,035,147 | 7/1991 | Woodward | 73/861.28 |
| 5,115,670 | 5/1992 | Shen | 73/61.41 |
| 5,179,862 | 1/1993 | Lynnworth et al. | 73/861.28 |
| 5,329,821 | 7/1994 | Birnbaum et al. | 73/861.28 |
| 5,440,937 | 8/1995 | Lynnworth et al. | 73/861.29 |

FOREIGN PATENT DOCUMENTS

| | | |
|---|---|---|
| 2071876 | 6/1991 | Canada. |
| 2079213 | 9/1991 | Canada. |
| 1297186 | 3/1992 | Canada. |
| 477419 | 1/1992 | European Pat. Off.. |
| 477418 | 1/1992 | European Pat. Off.. |
| 496156 | 7/1992 | European Pat. Off.. |
| WO9106830 | 5/1991 | WIPO. |
| WO9109280 | 6/1991 | WIPO. |
| WO9109281 | 6/1991 | WIPO. |

*Primary Examiner*—Richard Chilcot
*Assistant Examiner*—Jewel Artis
*Attorney, Agent, or Firm*—Robert C. Kain, Jr.

[57] ABSTRACT

The air velocity detector is used in combination with an air duct carrying heat, ventilation or air conditioned (HVAC) air therethrough. A rigid support subassembly is mounted in the HVAC air duct. At least a pair of ultrasonic transceivers are mounted in a spaced apart relationship facing each other on opposing end portions of the support subassembly. The acoustic, ultrasonic signal path from one transceiver to the other diagonally extends across a volume of duct covered by the rigid support subassembly. In one embodiment, the subassembly is a rigid sleeve mounted to the inboard, interior portions of the duct. In another embodiment, the subassembly is a rigid, substantially straight member diagonally extending through the duct volume. Electronic circuitry is connected to the transceivers which excites the transceivers, processes the received ultrasonic signal, and determines the phase difference or phase difference between the transmitted ultrasonic signal and the received ultrasonic signal. This phase difference representative signal is then used to calculate the velocity of the air. In one embodiment, additional temperature signals are obtained in order to determine the velocity of the air. In another embodiment, ultrasonic signals are first sent in one direction (from a first ultrasonic transceiver to a second ultrasonic transceiver) and then sent from the opposite end (from the second transceiver to the first transceiver). The resultant phase difference representative signals detected during each uni-directional transmission are subtracted from the other. The resultant signal is utilized to obtain the air velocity. In another embodiment, the system is calibrated when no air is flowing through the HVAC duct. The "still air" time or phase difference signal is utilized as a reference signal to compute air velocity during normal HVAC operations. A method of detecting air velocity in the HVAC duct is also disclosed.

14 Claims, 9 Drawing Sheets

ULTRASOUND AIR VELOCITY DETECTOR FOR HVAC DUCTS AND METHOD THEREFOR

The present invention relates to an ultrasound air velocity detector used in conjunction with ducts carrying air flow for heat, ventilation or air conditioning (HVAC) purpose and a method therefor.

BACKGROUND OF THE INVENTION

U.S. Pat. No. 4,425,805 to Ogura et al. discloses a respiration flow meter including a tube through which a patient blows air. A pair of recesses on the inner wall of the tube or conduit are diagonally aligned with respect to the longitudinal axial centerline of the respiration tube. A pair of ultrasonic transducers are mounted on the inner wall of the recesses. Electronic circuitry determines the velocity of the air flow through the tube by measuring the time differential between the transmission and reception of ultrasonic waves from one transducer to the other when the air in the tube is at rest and when air in the tube is placed in motion due to exhaling or inhaling of air by the patient. The velocity of the air is calculated based upon this time differential.

European patent publication No. 496,156 A2 (herein EP '156). EP '156 discloses an ultrasonic air flow measuring device having an ultrasonic transmitter spaced apart from an ultrasonic receiver, both of which are mounted on a pair of legs spaced about 0.1 meters apart. These legs are inserted into an air flow passage. By monitoring the time differential between the ultrasonic pulse in moving air as compared with the ultrasonic pulse in still air, the air flow measuring device is capable of measuring the velocity of air. The reference or base number for "still air" is determined either by sampling the external air temperature using a thermistor probe and determining the reference or base number using a known relationship between the speed of sound in still air at the measured temperature or by actually measuring the time difference between a transmitted and the received ultrasonic signal in still air. The flow measuring device in EP '156 measures air flow only between the legs retaining the transmitter and the detector.

PCT publication WO 91/09281, published Jun. 27, 1991 discloses an ultrasonic flow meter having a W-shaped ultrasound path inside a measurement tube. The tube also has a stepped elevation/depression on the internal wall of the tube at the site of reflection. The acoustic wave is generally V-shaped.

Canadian published patent disclosure No. 2,071,876 discloses an ultrasonic flow meter. The published Canadian patent application corresponds to published patent document PCT WO 91/09281. The Canadian '876 patent disclosure illustrates an ultrasonic flow meter which includes a tube through which a medium flows. The ultrasonic acoustic path lies within the interior of the tube. The transducer and receiver are fitted in a known manner to the side wall of the tube. It is preferred that the acoustic path or acoustic beam pass diagonally through the longitudinal axial centerline of the flow tube. This is an oblique injection of the ultrasonic waves. The obliquely injected ultrasonic waves are reflected in three successive reflections at the inner wall of the tube generating a W-shaped path between the transmitter and the receiver.

U.S. Pat. No. 4,493,216 to Hassler discloses a method and apparatus for conducting flow measurements on flow ting media utilizing an ultrasonic doppler method. The Hassler patent disclosure indicates that with the ultrasonic doppler method, it is known that flow measurements can be utilized to obtain flow velocity, flow cross-section data and volume flow. The Hassler ultrasonic flow detector includes a support carrying a small, centrally located ultrasonic transducer and larger ultrasonic transducer which surrounds the smaller, centrally located transducer. The support and the transducer heads are placed on the skin of a patient in order to detect blood flow through the arterial and venous systems of the patient.

U.S. Pat. No. 4,438,652 to Saito discloses an ultrasonic doppler flow meter wherein an ultrasonic wave is emitted into a fluid and a reflected ultrasonic wave is sensed due to a reflector in the fluid, such as a slurry contained in the fluid. In greater detail, the transmitted ultrasonic wave is subjected to a frequency modulation corresponding to the velocity of the reflected wave from the reflector or slurry in the fluid.

Canadian published patent application No. 2,079,213 discloses a gas or liquid ultrasonic flow meter. The ultrasonic flow meter includes a transmitter and a receiver wherein the receiver is in an optical path which is concentrically located on a special surface. A focused reflection of the ultrasonic wave is provided for in the ultrasonic acoustic radiation path.

U.S. Pat. No. 4,611,496 to Komachi discloses an ultrasonic flow meter using continuously generated ultrasonic waves. The Komachi patent disclosure states that in a conventional flow meter, the ultrasonic pulse beam is transmitted into the fluid so that the flow rate is obtained from the propagation time of the pulse in the fluid, that is, the flow rate is measured from the time difference between the transmitted and received ultrasonic pulses. In a continuous wave ultrasonic device, the ultrasonic beam is transmitted into the fluid for transmission directly to the ultrasonic receiver provided at another position in the fluid. The flow rate of the fluid is obtained from the phase difference or another quantity and depends upon the flow rate. Particularly, the Komachi ultrasonic flow meter generates a continuous ultrasonic wave which is not in the form of an ultrasonic beam but is rather establishes a standing wave in the cross-section of the tube and a propagating wave in the axial direction of the tube.

U.S. Pat. No. 4,922,750 to Magori utilizes an ultrasound phase different calculation method for measuring high flow rates. The Magori ultrasonic device utilizes a method for detecting the phase difference and is particularly related to measuring the flow of intake air into motor vehicles. Two ultrasonic transducers and two ultrasonic receivers are utilized such that the sonic waves from each transmitter cross the path of the flow media in an X-shaped pattern. Particularly, one receiver is down stream its respective transmitter and the other receiver is upstream its respective transmitter.

Canadian patent disclosure No. 1,297,186 discusses a procedure for analyzing the air content of a liquid or a suspension, for example, a pulp slurry. The disclosure states that measurements of attenuated ultrasonic waves reveal characteristics of a liquid or suspension and particularly pulp slurry. This method determines the attenuation of an ultrasound pulse when the ultrasonic wave is exponentially attenuated as a function of its path length. The Canadian '186 disclosure to measures a characteristic of the slurry based upon the attenuated intensity of the ultrasonic wave and the scattered intensity of that ultrasonic wave.

PCT published patent document WO 91/09280 discloses an ultrasonic gas/fluid flow meter. The ultrasonic fluid flow meter utilizes two transducers generating a W-shaped acoustic wave in the flow tube.

PCT published patent document WO 91/06830 discloses a variable area obstruction gas flow meter. This flow meter includes a variable area obstruction which is mounted in a conduit. The variable area obstruction comprises elastic membranes consisting of first, second and third leaves which extend into the flow stream.

U.S. Pat. No. 4,519,260 to Fu et al. discloses the use of ultrasonic transducers and various applications thereof. Particularly, the Fu patent disclosure illustrates two ultrasonic transducers used to measure blood volume flow and imaging subcutaneous parts of a patient.

U.S. Pat. No. 4,823,612 to Ichino discloses a socket structure for mounting ultrasonic gas flow measuring devices. The socket structure mounts ultrasonic gas flow measuring devices in a gas flow pipe. Ichino states that it is well known in the art to propagate ultrasonic waves through a gas flowing through a pipe in order to measure the velocity and particularly the flow velocity of the gas. The transmitter and receiver are obliquely disposed with respect to the longitudinal axial centerline of the pipe which contains the flowing gas.

OBJECTS OF THE INVENTION

It is an object of the present invention to provide a air velocity detector that utilizes ultrasonic transceivers is HVAC ducts.

It is another object of the present invention to provide an air velocity detector which minimizes vibratory movement between the ultrasonic transceivers. Vibratory movement is customarily present in HVAC ducts.

It is another object of the present invention to provide an ultrasonic air velocity detector which bi-directionally transmits ultrasonic waves between the transceivers or transducers in order to detect air velocity.

It is a further object of the present invention to provide an ultrasonic air velocity detector for HVAC ducts which utilizes a rigid support member which significantly reduces or substantially eliminates vibratory movement affecting the quality and timing of the ultrasonic signal sent and received by the respective ultrasonic detectors transceivers.

It is a further object of the present invention to provide an ultrasonic air velocity detector for HVAC ducts which averages air flow or velocity through the duct volume because the acoustic path between the transceivers diagonally traverses the duct, preferably through or near the axial centerline of the duct.

SUMMARY OF THE INVENTION

The air velocity detector is used in combination with an air duct carrying heat, ventilation or air conditioned (HVAC) air therethrough. A rigid support subassembly is mounted in the HVAC air duct. At least a pair of ultrasonic transceivers are mounted in a spaced apart relationship facing each other on opposing end portions of the support subassembly. The acoustic, ultrasonic signal path from one transceiver to the other diagonally extends across a volume of duct covered by the rigid support subassembly. In one embodiment, the subassembly is a rigid sleeve mounted to the inboard, interior portions of the duct. In another embodiment, the subassembly is a rigid, substantially straight member diagonally extending through the duct volume. Electronic circuitry is connected to the transceivers which excites the transceivers, processes the received ultrasonic signal, and determines the phase difference between the transmitted ultrasonic signal and the received ultrasonic signal. This difference representative signal is then used to calculate the velocity of the air. Particularly, the detector determines the phase differential between the transmitted ultrasonic signals and the received ultrasonic signals. This phase differential is then used to calculate the velocity of the air. In one embodiment, additional temperature signals are obtained in order to determine the velocity of the air. In another embodiment, ultrasonic signals are first sent in one direction (from a first ultrasonic transceiver to a second ultrasonic transceiver) and then sent from the opposite end (from the second transceiver to the first transceiver). The resultant phase differential representative signals detected during each uni-directional transmission are subtracted from the other. The resultant signal is utilized to obtain the air velocity. In another embodiment, the system is calibrated when no air is flowing through the HVAC duct. The "still air" phase difference signal is utilized as a reference signal to compute air velocity during normal HVAC operations. A method of detecting air velocity in the HVAC duct is also disclosed.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an air velocity detector used in combination with an HVAC duct and a method therefor.

Figure 1:
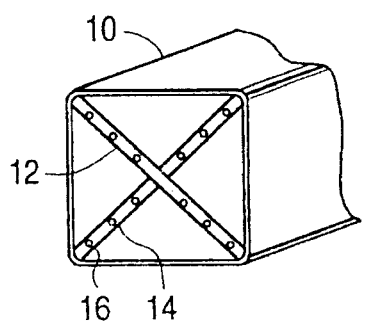
FIG. 1 diagrammatically illustrates a prior art device which may be used to determine air velocity in a duct carrying heat, ventilation or air conditioning (HVAC) air flow.

FIG. 1 diagrammatically illustrates a heat, ventilation or air conditioning (HVAC) air duct 10 which includes diagonally mounted struts 12, 14 carrying a plurality of air flow sensors one of which is sensor 16. These sensors 16 may use a hot wire or RTD system which detect air flow based on the change in resistance of the wire. The temperature and hence the resistance of the wire changes when air passes over the hot wire. Another prior art sensor utilizes a pressure differential caused by pitot tube. In pitot pressure sensors, the total pressure is equivalent to the static pressure plus the pressure developed by the velocity of the air passing over the open end of the pitot tube. Prior art devices obtain signals from either the temperature sensing detectors or the pitot tubes and average those signals. Accordingly, the prior art devices utilize signals from a plurality of sensors mounted in struts 12, 14 generally located in a single, cross sectional plane extending through the HVAC duct. The prior art air velocity detector systems mathematically average the signals output from the plurality of sensors located at discrete positions in a defined cross-sectional plane normal to the axial centerline of the duct. However, air velocity at any point in a given cross-sectional plane of an HVAC duct is significantly different from the velocity at another point on the plane. Generally, air velocity is lower near the walls of the duct and is greater along the axial center line of the duct. Further, the air velocity at any particular point in a defined cross section of the duct dramatically changes if the duct is angulated (90°, 45°, 20° etc.) upstream of the cross-section. Prior art systems utilize point measurement and mathematically average sensor output signals. The resulting average is not a true average of air flow or velocity through the duct. The prior art systems suffer from another defect which results from the disruption of the air flow due to the diagonally disposed struts 12, 14.

The present invention overcomes these and other defects in prior art devices by measuring the actual air flow velocity throughout the entire duct in a continuous, analog fashion.

Figure 2:
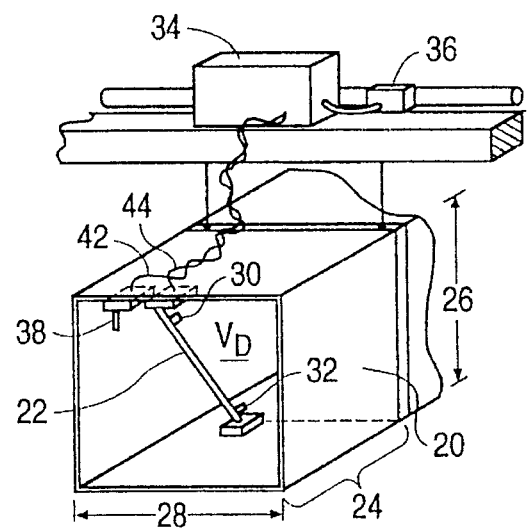
FIG. 2 diagrammatically illustrates the air velocity detector in the HVAC duct in accordance with the principles of the present invention.

FIG. 2 diagrammatically illustrates one embodiment of the present invention which is disposed in HVAC duct 20. As is known in the art, HVAC duct 20 is made of very thin sheet metal. This sheet metal is approximately 10–20 thousands of an inch thick and is subject to significant vibration caused by environmental conditions. This vibration can be introduced into the HVAC duct by fans, air flow control units (vents) as well as by temperature changes due to hot or cold air flowing through the duct or pressure changes in the duct. An experiment has shown that duct vibration causes 20–30% signal variation if ultrasonic transceivers (operating in the range of 20 KHz–100 KHz, but preferably around 40 KHz) are mounted on interior walls of an HVAC duct without rigid support subassemblies. The signals obtained from the unsupported ultrasonic transceivers varied 20–30% due to the vibration and the environmental conditions of the HVAC duct. Basically, the system could not be calibrated and even when calibrated the phase differential signals varied 20–30% for the same air velocity. The HVAC vibratory duct movement caused the ultrasonic transceivers to move which in turn adversely affected the quality of the received signal. In order to overcome this problem, it was discovered that a rigid support subassembly mounting the pair of ultrasonic transceivers in the duct significantly reduced and possibly eliminated the effects of vibration commonly found in HVAC ducts.

FIG. 2 diagrammatically illustrates one embodiment showing a rigid support subassembly 22 formed as a diagonally disposed straight member, rod or tube extending through duct volume $V_D$ defined by the longitudinal span 24 as well as the height 26 of the duct and the width 28 of the duct. In one embodiment, HVAC duct is 20–22 gage sheet metal. Vibration is caused by fans, air conditioning units, flow control devices, temperature differentials between the air in the duct and the ambient air as well as static pressure differentials between the air in the duct and the ambient environment. The rigid support member substantially eliminates independent vibratory movement of each sensor with respect to the other and signal degradation between the two transceivers caused by HVAC duct vibration.

Figure 3:
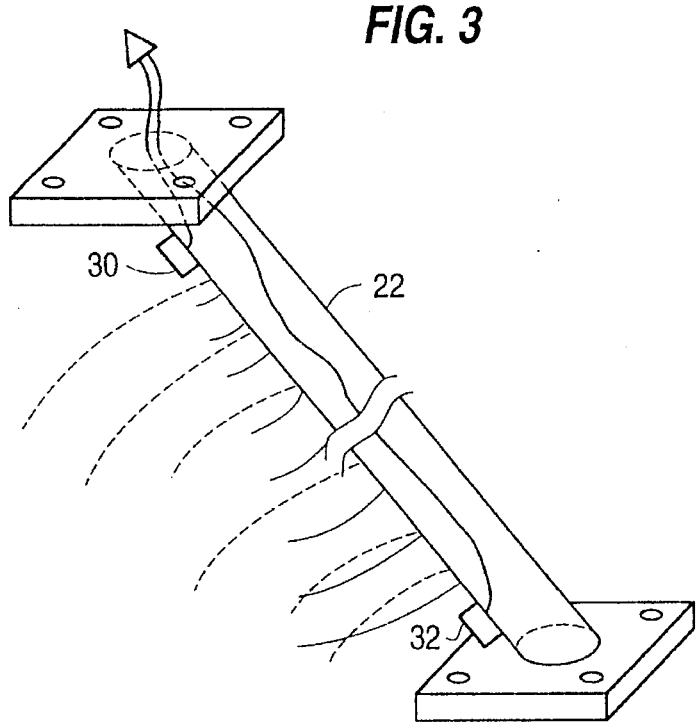
FIG. 3 diagrammatically illustrates one embodiment of the rigid support subassembly onto which is mounted the ultrasonic transceivers in accordance with the principals of the present invention.

As shown in FIG. 3, rigid support straight member 22 has mounted thereon ultrasonic transceiver 30 at one end and ultrasonic transceiver 32 at the opposing end. Ultrasonic wave fronts from transceiver 30 sent to transceiver 32 are shown as solid lines in FIG. 3. Ultrasonic signals or waves sent from transceiver 32 are shown as dashed waveforms in FIG. 3. In one embodiment, rigid support straight member 22 is a thin wall, steel metal tube having an outside diameter of about one quarter inch. Control wire or wires from each transceiver are placed inside the tube and extend outboard from HVAC duct 20 as shown in FIG. 2. These wires lead to a control box 34. Output signals and input commands from and to control box 34 are sent over cables retained by communications conduits 36. In addition, in one embodiment, temperature signals are obtained with box temperature sensor 38 disposed in the interior of HVAC duct 20. The temperature representative signals are generated by sensor 38 and sent to control box 34 on electrical cable or wire 42. Electrical cable wire 44 (which may include several wires) electrically couple control 34 with transducers 30, 32 which are mounted on rigid, diagonally disposed, support member 22.

Figure 4A:
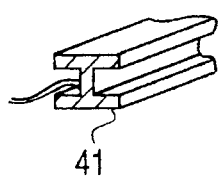
FIGS. 4A, 4B and 4C diagrammatically illustrate different embodiments of the straight, diagonally disposed support assembly.
Figure 4B:
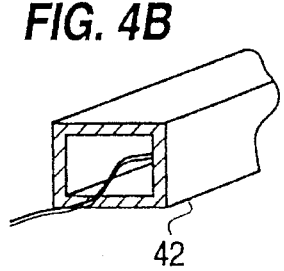
Figure 4C:
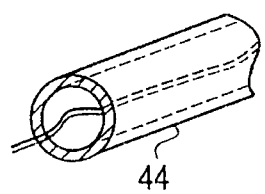

FIGS. 4A, 4B and 4C show several different configurations for the diagonal support member. FIG. 4A shows an I-beam configuration for straight member 41; FIG. 4B shows a rectangular box member 42; and, FIG. 4C shows a tube 44 forming the straight support member.

Figure 5A:
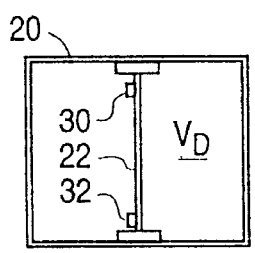
FIGS. 5A and 5B diagrammatically illustrate a front view and a side view of the diagonally disposed rigid, subassembly.
Figure 5B:
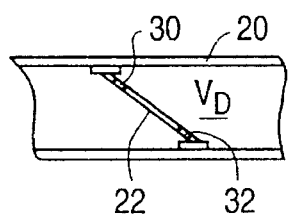

FIGS. 5A and 5B respectively show front elevational and side views of HVAC duct 20 and diagonally disposed straight member 22 carrying ultrasonic transducers 30, 32 at opposing end portions of that support. FIG. 5B shows a side view of HVAC duct 20 and straight support member 22 with transducers 30, 32 at opposing ends. Accordingly, air flow, normal to the plane of the page in FIG. 5A, passes through an imaginary line connecting transducer 30 and transducer 32. The imaginary line is the acoustic signal path. Since air flow through the entire duct volume $V_D$ is detected by the phase shift relationship of the transmitted ultrasonic wave as compared with the received wave, the air velocity detector in accordance with the present invention provides an analog signal which measures air velocity throughout the entire volume $V_D$. Averaging multiple signals from multiple sensors as in prior art systems is not necessary. The rigid support member substantially eliminates or entirely reduces environmental vibration commonly found in HVAC duct 20 which adversely affects the precise relative positions of the ultrasonic transceivers.

Figure 6:
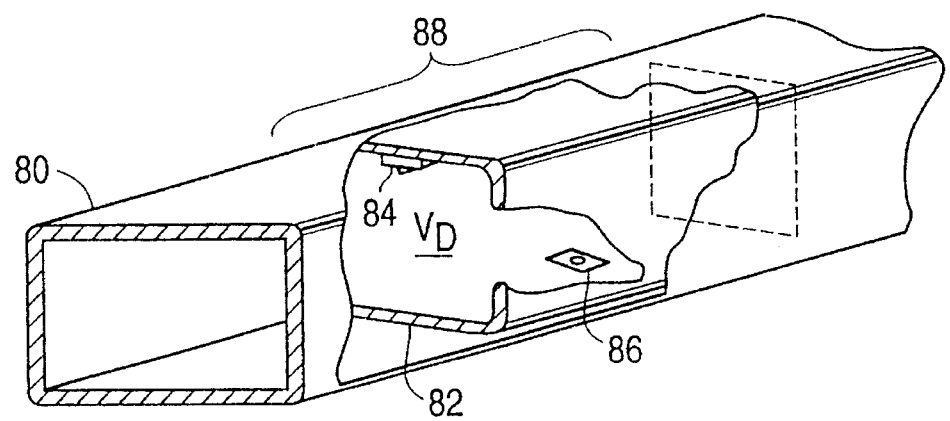
FIG. 6 diagrammatically illustrates another embodiment of the present invention wherein the rigid support subassembly is a sleeve disposed in the HVAC duct over the duct volume measurement region.
Figure 7:
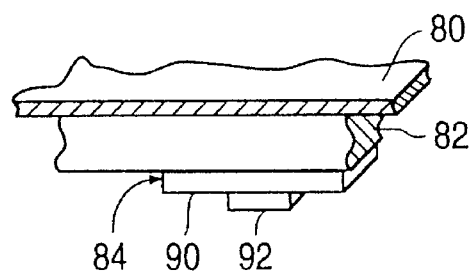
FIG. 7 is a partial, cross sectional, broken away view showing a portion of the HVAC duct, the rigid support sleeve assembly and one of the ultrasonic transceivers.

FIG. 6 diagrammatically illustrates another HVAC duct 80 carrying, in its interior or as a joining piece, a rigid support subassembly which is configured as a sleeve 82. As shown in FIG. 7, HVAC duct 80 is significantly thinner than sleeve 82. Since both transceivers are affixed to sleeve 82, any vibration encountered by one transceiver is simultaneously experienced by the other, resulting in no relative motion between the two transceivers. Accordingly, ultrasonic signals transmitted between ultrasonic transceivers 84 and 86 are not significantly affected by this vibration. Rigid support sleeve 82 defines duct volume $V_D$ and permits measurement of air velocity through $V_D$ without disrupting air flow through the volume. Since duct volume $V_D$ in the sleeve is substantially equivalent to the duct volume throughout other similar longitudinal spans in the duct, a very accurate measurement of air velocity can be obtained with a device made in accordance with the principles of the present invention.

FIG. 7 shows a detailed view of ultrasonic transceiver 84 and, in particular shows a mounting base 90 and a transceiver unit 92 placed on mounting base 90.

Figure 8:
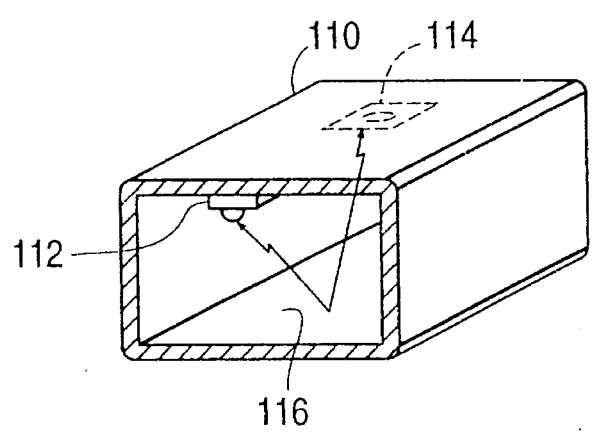
FIG. 8 diagrammatically illustrates another embodiment of the air velocity detector utilizing reflected ultrasonic signals within a rigid support sleeve subassembly.

FIG. 8 diagrammatically illustrates another embodiment of the present invention wherein rigid support sleeve 110 is disposed in HVAC duct (not illustrated) and ultrasonic transducers 112 and 114 transmit and receive ultrasonic signals by reflection from opposing wall 116 of the rigid sleeve. In a sense, ultrasonic transducers 112 and 114 face each other and are disposed on opposing end portions of sleeve 110. The same is true regarding ultrasonic transducers 84, 86 in FIG. 6 since those transducers are mounted at generally opposing and facing end portions of rigid sleeve 82. With respect to diagonally disposed, rigid member 22 in FIGS. 2 and 3, ultrasonic transceivers 30, 32 are also disposed generally at or near the end portions of that diagonally disposed rigid member. If the transducers are disposed further inboard towards the axial center line of HVAC duct 20, 80, the integrity and the quality of the signals obtain from transceivers 30, 32, 84, 86 and 112, 114 may be degraded.

Figure 9:
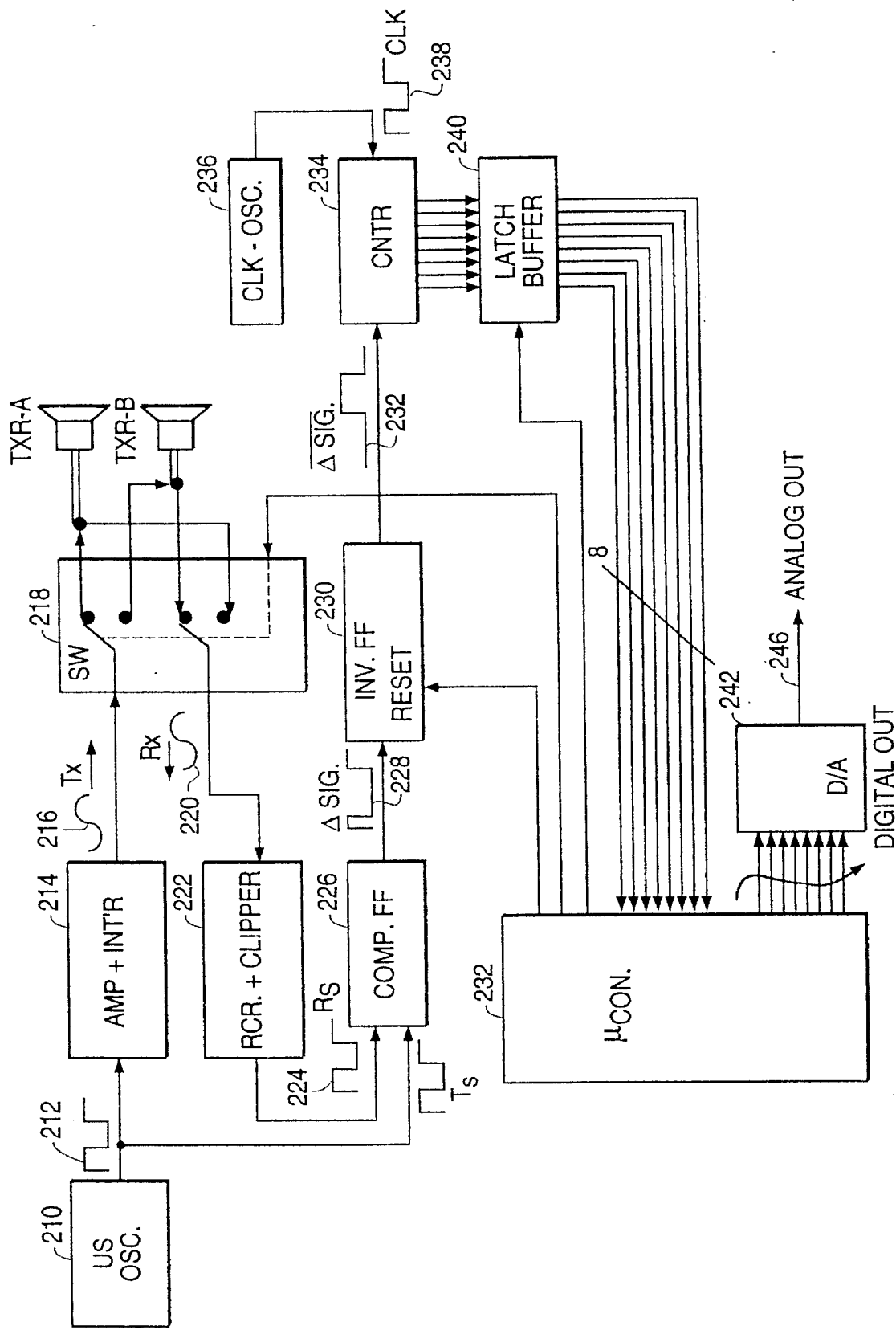
FIG. 9 diagrammatically illustrates, in block diagram form, one type of electronic circuitry utilized to excite the ultrasound transceivers, process the transmitted and received signals and detect the phase differential signal for the air velocity detector.

FIG. 9 diagrammatically illustrates a block diagram of the electronic circuitry which processes and handles the signals to and from the ultrasonic transceivers. An ultrasonic oscillator 210 generates a square wave 212 which is fed into an amplifier and integrator 214. The amplifier and integrator alters the input signal and changes it into a sinusoidal signal 216 which is the transmitted signal (TX) fed to either ultrasonic transceiver A or ultrasonic transceiver B dependent upon the position of switch 218. In the illustrated circuit configuration, switch 218 is exciting transceiver TXR-A such that ultrasonic waves are admitted from that transceiver. On the other hand, transceiver TXR-B is in a receive mode and the received sinusoidal signal 220 or signal RX is fed to receiver and a clipper 222. The output of the receiver and the clipper is a square wave 224 identified as signal $R_S$. This square wave signal is fed into a comparator/flip-flop 226. Comparator/flip-flop 226 is also fed the square wave transmitted signal $T_S$ generated by ultrasonic oscillator 210.

The output of flip-flop 226 is a square wave 228 that essentially represents the phase difference between the transmitted ultrasonic signal and the received ultrasonic signal. Signal 228 (Δ sig.) is processed through a flip-flop 230 such that one pulse, whose width is proportional to the phase difference between transmitted and received signals (as represented by bar delta sig), is sent to counter 234. Counter 234 is additionally clocked by a high speed continuous square wave of a precise and known frequency signal CLK 238. Counter 234 output will be an 8 to 14 bit representation of the phase difference measured in one time period. The microprocessor 232 then stores this number. Counter 234 and flip-flop 239 are then reset, and switch 218 is reset such that TXR-B is excited and TXR-A is used as a receiver. The same process is executed again to find the phase difference. These two phase difference signals are then subtracted. This sum is then proportional to only the average air velocity.

In FIG. 9, this phase difference representative signal or phase shift signal is illustrated as Δ sig. The Δ sig signal is then applied to an invertor flip-flop 230 which is periodically reset by micro controller 232. The signal output from inversion flip-flop 230 is a square wave signal 232 identified as bar Δ sig. in FIG. 9. This converted, complementary signal is essentially the difference between the phase shift signal and another signal representing a set pulse width, i.e, a predetermined cycle. The bar Δ sig signal 232 is applied to a counter 234. Counter 234 is supplied with a clock or timing signal from oscillator 236. The clock signal CLK is shown as square wave signal 238 in FIG. 9. At a certain time, the output from counter 234 is obtained by a latch or buffer 240. This latch or buffer then holds, in its digital output, the results of the counter which reveals phase difference representative signals or a phase shift representative signals from the transmitted wave with respect to the received wave for ultrasonic transducers TXR-A and TXR-B. The output from latch/buffer 240 is gathered by micro controller 232 as needed. The micro controller output is further applied to a digital to analog converter 242. An analog output is available on line 246. A digital output can also be obtained from the bus coupled to the input of D to A converter 242.

Figure 10:
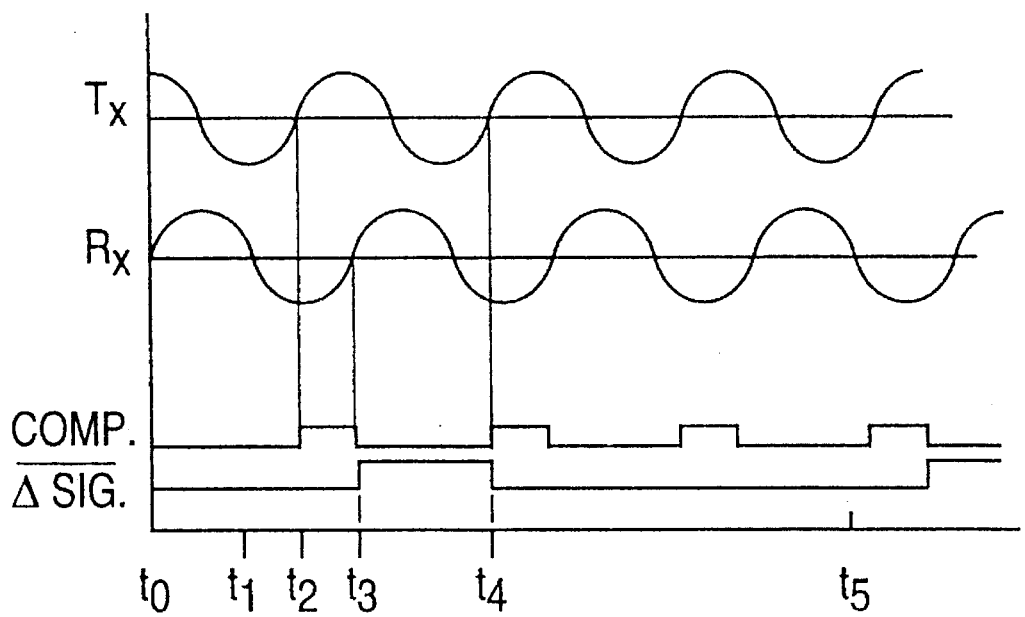
FIG. 10 illustrates a timing diagram showing one method of detecting the phase differential between the transmitted ultrasonic wave and the received ultrasonic wave.

FIG. 10 illustrates a timing diagram showing most of the major signals in the circuit described above. The transmitted ultrasound wave signal is shown as signal Tx in FIG. 10. The received signal Rx is shown as being phase shifted from signal Tx. A complete wave cycle Tx is shown from time $t_2$ through time $t_4$. Time $t_2$ is the zero crossing of the transmitted wave Tx. The received signal Rs crosses the zero base at time $t_3$. The flip-flop comparator 226 (FIG.9) fires at time $t_2$ or at zero crossing of transmitted wave Tx. The output of that flip-flop remains high until the zero crossing of the received wave Rx at time t3. The inverted or bar Δ sig signal goes high between times $t_3$ and $t_4$. The high signal from time $t_3$ until $t_4$ is essentially the difference between COMP signal (which is the actual phase difference signal) and the total time for the complete cycle (time $t_2$ through $t_4$). COMP signal is the Δ sig signal output from comparator 226.

Timing Table
The Timing Table shown below provides further explanation of the activity at each time

| Time | Action |
| --- | --- |
| $t_1$ | Reset inv. FF |
| $t_2$ | TX high and RX Low |
| $t_3$ | RX Low, invertor FF high |
| $t_4$ | TX high and RX Low |
| $t_5$ | Reset invertor FF |

It is known in the art that the velocity of sound c in air and particularly in still air is governed by the following equation.

$$c = (331.5 + (0.607 \times t)) \text{ meters per sec.} \qquad \text{Eq. 1}$$

where t is ambient air temperature in degrees C, and c is velocity of sound in still air.

If the air is moving, the speed of sound is changed based upon the velocity of air $V_a$. Equation 2 which follows illustrates the mathematical relation between the velocity of air $V_a$ and the velocity of sound c in that air.

$$c = ((331.5 + (0.607 \times t)) + V_a) \text{ meters per sec.} \qquad \text{Eq. 2}$$

where $V_a$ is velocity of air in meters per sec. and c the detected is velocity of sound in air.

In the present invention, if a single transmission from one ultrasonic transducer to another ultrasonic transducer is to be utilized, the control circuit must account for the temperature t of the air. In FIG. 2, temperature sensor 32 (which may be a thermistor) is utilized to obtain a temperature signal. In another embodiment, the present invention can generate one ultrasound signal from the first transducer to a second transducer and obtain a phase difference signal. In this further embodiment, the second transducer then emits an ultrasound signal to the first transducer. This is the bi-directional measurement method. If air flow is present over an imaginary line joining or passing through the ultrasonic transducers, the phase differential signal from the second transducer to the first transducer is different compared to the phase differential signal from the first transducer to the second transducer. By subtracting the two bi-directional signal phase differences, the temperature term in Eq. 2 is canceled so that temperature information is not needed. The direction of the air flow is based upon the mathematical sign (+ or −) of the result of this mathematical algorithm. If a first directional transmission—reception, phase difference signal is represented by counter value A and the opposite or second directional phase difference signal is represented by counter value B, if A is larger than B, the air velocity is proportional to A-B. If B is larger than A, the microprocessor and related software obtains the digital complement of B (for example, in an 8-bit system 256-B is the digital complement of B) and then subtracts the digital complement of B from value A. This is accomplished by the microprocessor.

Air mass can be computed based upon the detected air velocity if one also obtains other known parameters.

A third method to calibrate the system utilizes measuring the phase differential in still air and recording that differential signal in the micro controller or other associated electronic circuitry.

Ideally, the acoustic path spanning the two transceivers of the present invention is obliquely disposed with respect to and passes through or near the axial centerline of the HVAC duct.

In a presently preferred embodiment of the present invention, the phase difference is measured between the transmitted and received ultrasonic signals. This central theory of the invention is shown in the following equation.

Velocity of sound in air is described as:

$$C = [(331.5 + (0.607t) + Va] \text{m/SEC} \qquad \text{Eq. 3}$$

Where Va is the air velocity.

In an 8 inch diameter air duct (a very common size), the signal path between two diagonally opposed transducers is approximately 25 cm. Therefore, the time required for sound to travel from one transducer to another would be in the order of 800 μsec. The time difference caused by Va (for a maximum Va of 20 m/SEC) is from 0 to 24 μsec. It is very difficult to measure a change of 1 or 2 μsec in a span of 800 μsec. As duct sizes increase, the transmit time increases but not the time difference caused by Va.

Measurement of the phase difference between a transmitted and a received pulse is used because the period of the ultrasonic signal is 25 μsec. A change of 0.1 μsec can easily be detected if phase comparison is utilized and measured by the system.

With bi-directional measurements, the temperature terms in Eq. 3 cancel so that no temperature compensation of the final measured signal is required. In addition any changes in the speed of sound due to pressure are also canceled.

Another reason which distinguishes phase differential measurement from time difference measurement is that prior art methods of "time of flight" measurement of distance or air velocity are well known.

Mathematically, the invention can be stated as:

$$\text{Transit Time } A \text{ to } B = ((331.5 + (0.607t)) + Va) \text{m/SEC per meter} \qquad \text{Eq. 4}$$

$$\text{Transit Time } B \text{ to } A = ((331.5 + (0.607t)) - Va) \text{m/SEC per meter} \qquad \text{Eq. 5}$$

$$(\text{Transit Time } A \text{ to } B) - (\text{Transit Time } B \text{ to } A) = 2Va \text{ m/SEC per meter} \qquad \text{Eq. 6}$$

In a strict sense, a phase difference signal is a time-based measurement between the transmitted signal and the received ultrasonic signal. The claims appended hereto refer to a phase difference signal. The use of the term "phase difference" or "phase differential" is meant to include such small time-based measurements between the transmitted and the received ultrasonic signals.

Figure 11:
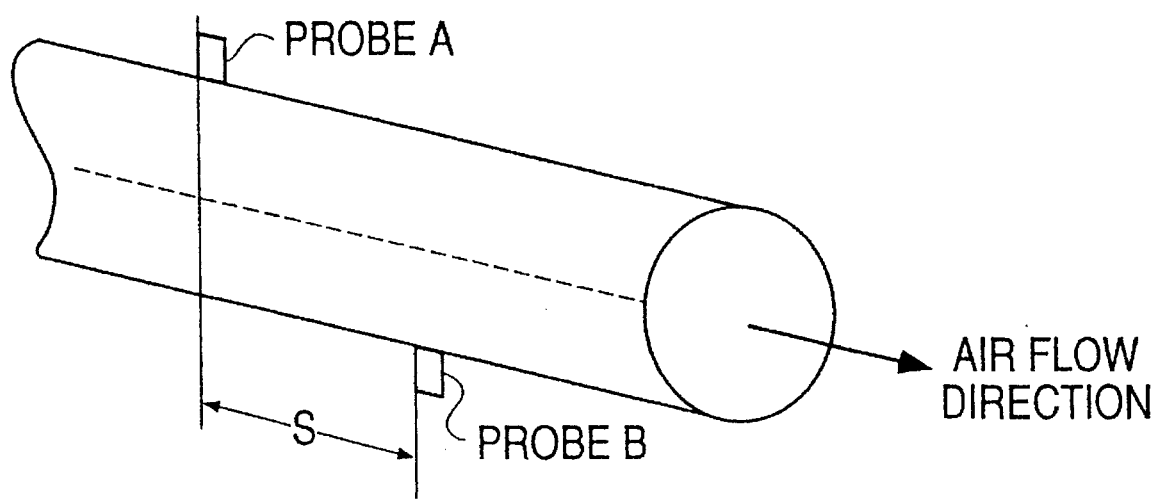
FIG. 11 diagrammatically illustrates longitudinal spacing between the two ultrasonic transceivers.

FIG. 11 illustrates the preferred longitudinal spacing S between transceivers PROBE A and PROBE B. The following table shows the preferred probe location for typical air flow.

| Duct Diameter (in.) | Spacing S (in.) |
| --- | --- |
| 5 | 4 |
| 8 | 6.5 |
| 12 | 9.5 |
| 16 | 13 |

The distance S varies for different size ducts such that for any estimated maximum air velocity through the duct, the phase differential does not exceed 360 degrees. Ultrasonic transceivers operating at 40 KHz are currently utilized in these detection systems.

The bi-directional, phase differential measurement technique is preferable because in experimental tests, one-way air velocity detection varied considerably based upon temperature and pressure. Temperature and pressure changes affect the spacing distance S between the transceivers dependent upon the time of day and other environmental conditions.

Figure 12:
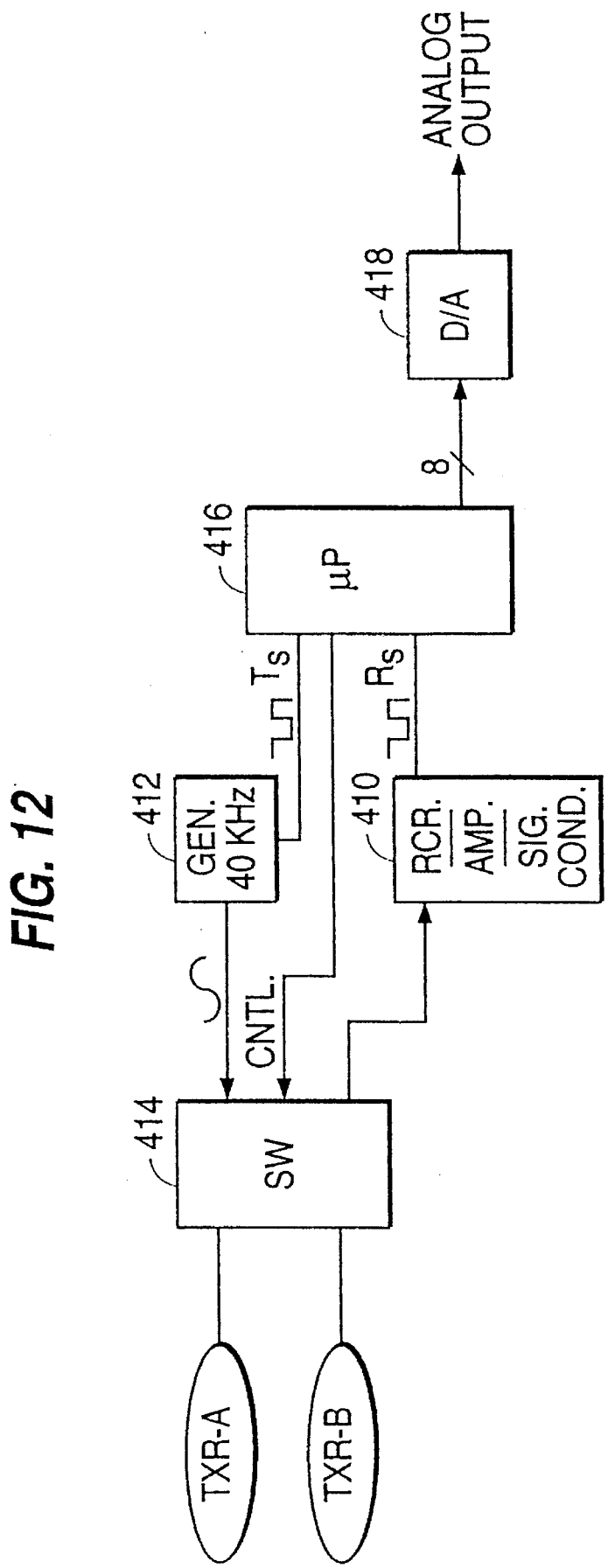
FIG. 12 diagrammatically illustrates a microprocessor or microcontroller based electronic system for exciting and processing the received signals to detect the phase differential signal.

FIG. 12 shows a microprocessor based system. The transceivers TXR-A and TXR-B are excited and the received signals are transferred to a receiver, amplifier and signal conditioning unit 410. The transceivers are driven in this embodiment by a 40 KHz generator 412. Switch 414 excites and conveys signals to and from the transceivers under control of the microprocessor 416 based upon control signal or signals CNTL applied to the switch.

Microprocessor 416 is a RISC-based processor or controller operating at about 5M instructions per second. In one embodiment, an EPROM PIC 16C5X 8-bit CMOS microcontroller manufactured by Microship is utilized. The output of microprocessor 416 is applied to digital analog converter 418.

Figure 13A:
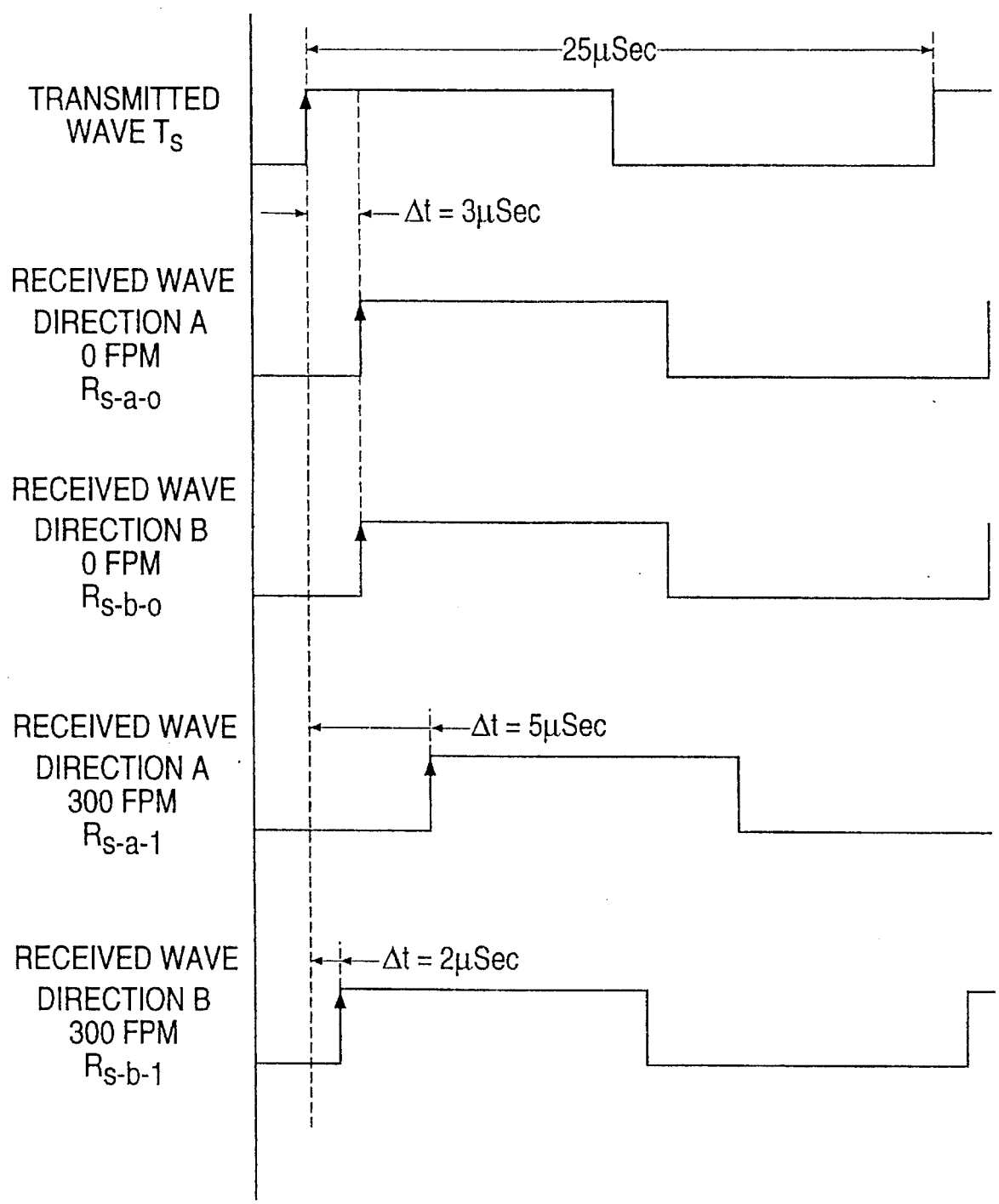
FIGS. 13A and 13B diagrammatically illustrate the timing sequence for a post trigger signal (FIG. 13A) and a pre-trigger signal (FIG. 13B); and, FIGS. 14A and 14B diagrammatically illustrate a process diagram for the microprocessor based system.
Figure 13B:
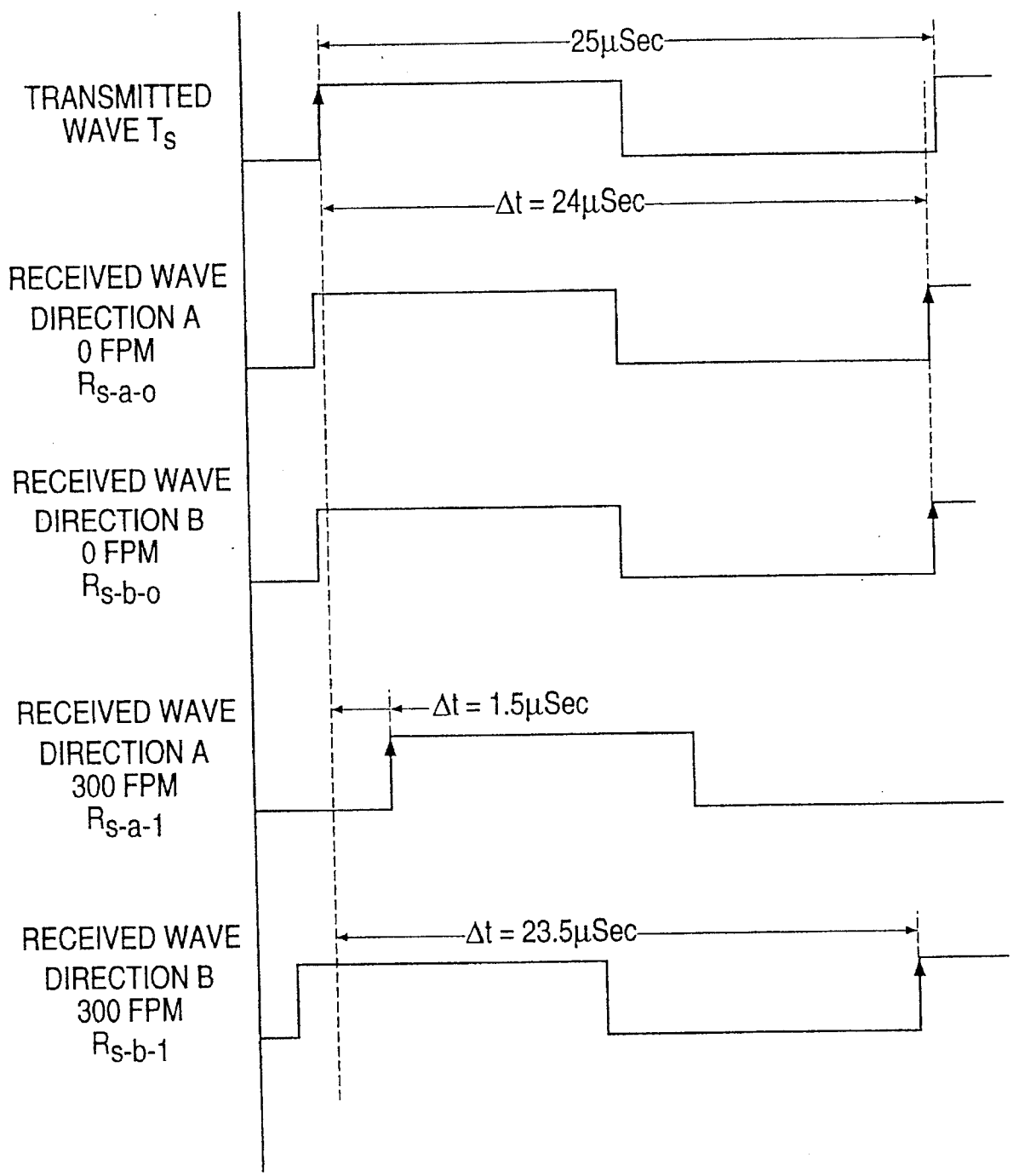

FIGS. 13A and 13B respectively illustrate timing diagrams for zero air velocity, shown as O FPM, for received wave signals $R_{s-a-o}$ and $R_{s-b-o}$ from transceivers A and B, respectively as compared with air velocity 300 FPM (foot per minute) as an example showing received signals $R_{s-a-1}$ and $R_{s-b-1}$. These four signals are illustrated in conjunction with the transmitted or excitation wave $T_s$. FIG. 13A shows that the bi-directional method with zero air velocity does not result in a measurable phase difference. However, the absence of a detectible phase differential may be a result of the accuracy of the transceivers and the processing circuitry. In contrast, there is a reasonable phase differential of 3 μsec between $R_{s-a-1}$ and $R_{s-b-1}$. Equations 7 and 8 which follows show the relationship of these signals $$\Delta \text{ Phase } A > \Delta \text{ Phase } B \qquad \text{Eq. 7}$$

$$\Delta \text{ Phase } A - \Delta \text{ Phase } B = 5 - 2 = 3 \text{ μSEC Total Phase Shift} \qquad \text{Eq. 8}$$

FIG. 13B shows a leading edge phase differential wherein the leading edge of $R_{s-a-o}$, $P_{s-b-o}$ and $R_{s-b-1}$ precedes the excitation wave $T_s$. Received wave $R_{s-a-1}$ begins subsequent to wave $T_s$. Equations 9 and 10 show the analytical relationship of these waves.

$$\Delta \text{ Phase } A < \Delta \text{ Phase } B \qquad \text{Eq. 9}$$

$$25 \text{ μSec} - \Delta\text{Phase } B + \Delta\text{Phase } A = (25-23.5)+1.5=3 \text{ μSEC Total Phase Shift} \qquad \text{Eq. 10}$$

In Equation 10, the digital compliment of $R_{s-b-1}$ is obtained by subtracting an entire cycle of $T_s$ from the total phase shift.

Figure 14A:
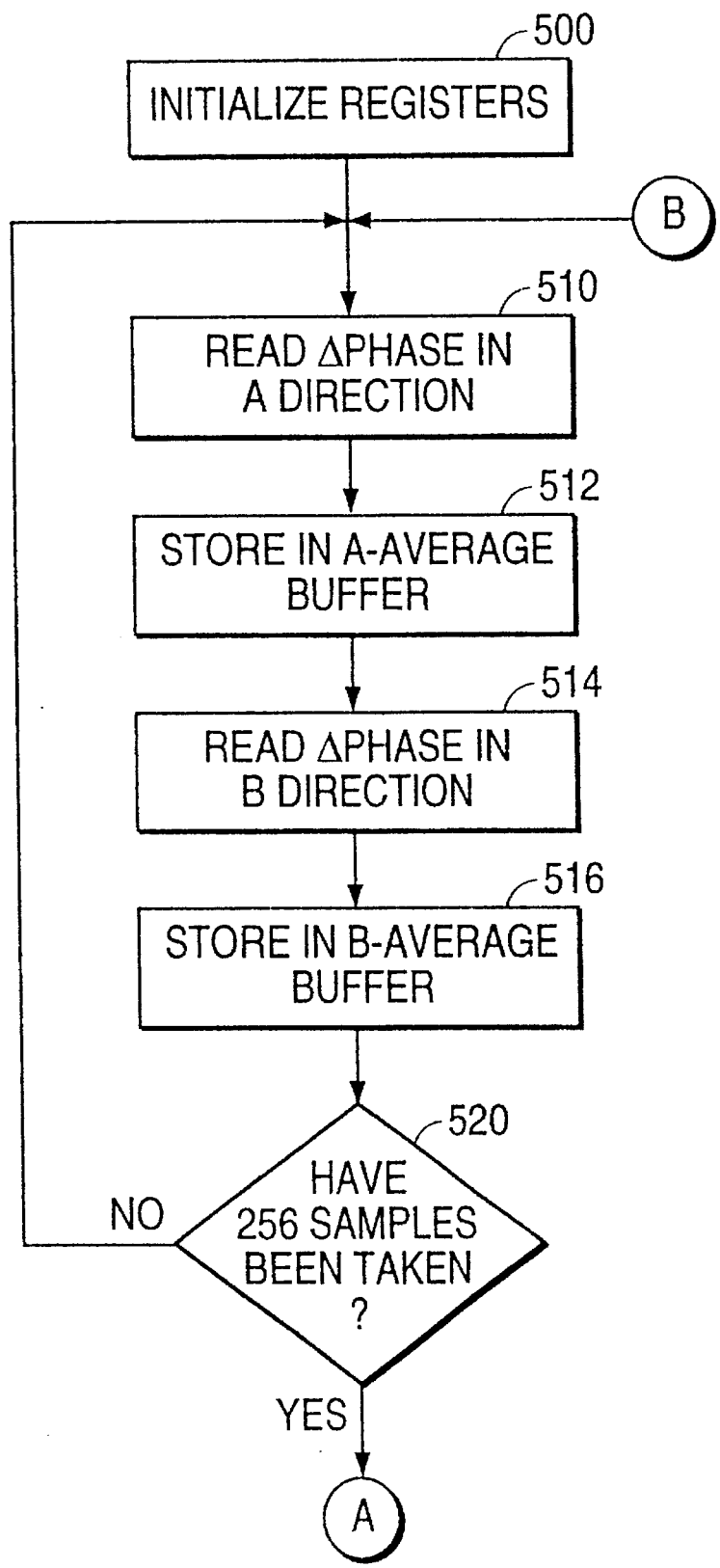
Figure 14B:
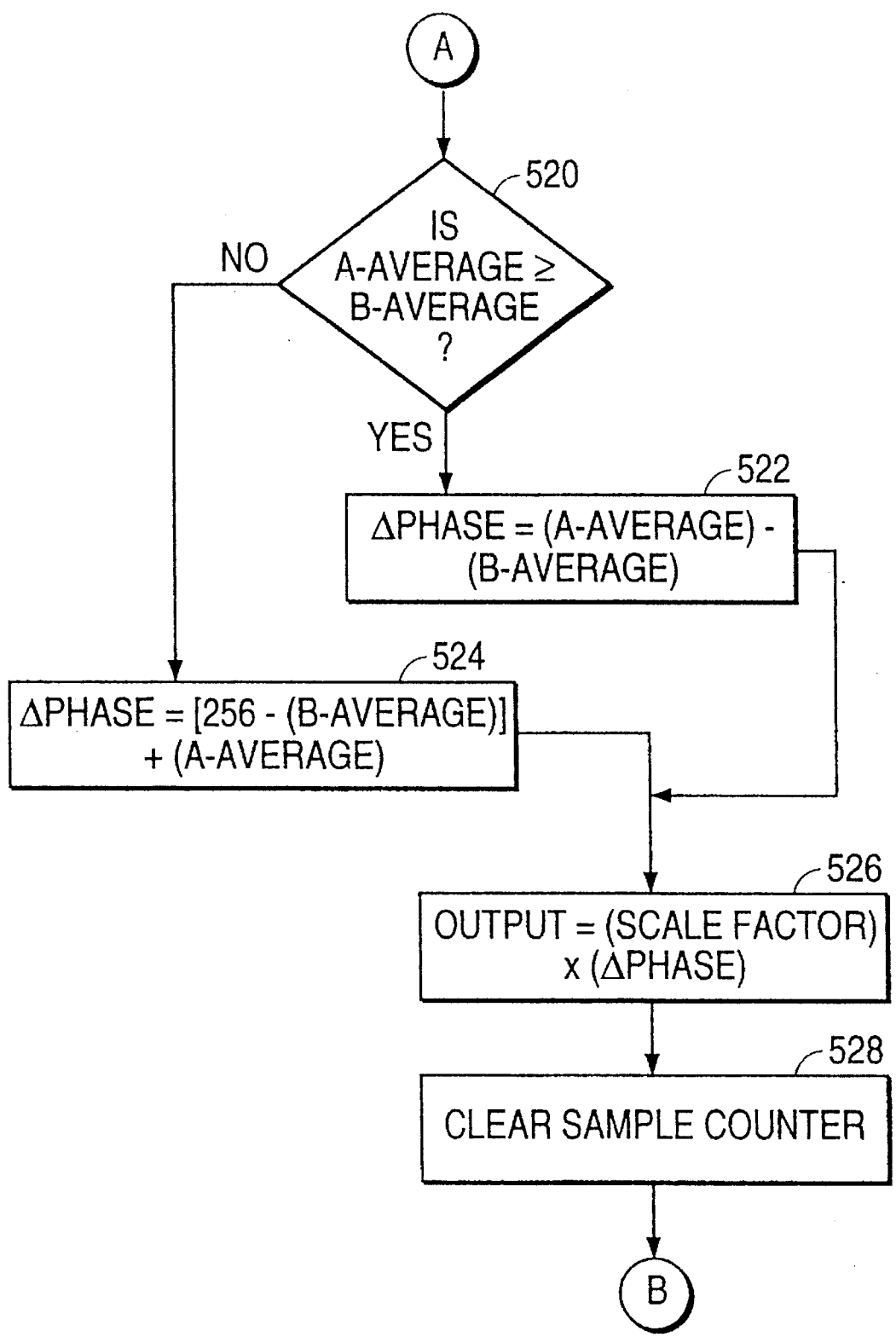

FIGS. 14A and 14B show the process diagram for this system. Step 500 initializes the registers. Step 510 reads the phase differential in direction A. Step 512 stores the average of the phase differentials in direction A in a buffer or memory location. Steps 514 and 516 repeat the process for phase detection in direction B. Decision step 520 determines whether 256 samples (for an 8-bit machine) are obtained. The NO branch re-cycles the program back to step 510.

The YES branch leads to FIG. 14B (jump step A) and decision step 520. Step 520 determines whether the A average value is larger than or equal to the B average value. If NO, step 524 obtains the digital compliment of the B average and computes phase differential from the result of that compliment and the A average. If the YES branch is taken from decision step 520, the program executes step 522 to compute the phase differential as the difference between the A average and the B average.

In either case, the program executes step 526 which obtains an output which is related to the phase differential. Step 528 clears the counter (in the microprocessor 416 or counter 234).

The claims appended hereto are meant to cover modifications and changes within the spirit and scope of the present invention.

What is claimed is:

1. In combination with a duct carrying air flow for heat, ventilation or air conditioning, an air velocity detector utilizing spaced apart ultrasound transceivers comprising:

a rigid support subassembly mounted in said duct, said ultrasound transceivers mounted, in a spaced part relationship facing each other, on opposing end portions of said subassembly such that air, passing through said duct, crosses a sensory path laterally extending across said duct between said spaced apart transceivers;

electronic circuitry coupled to said transceivers having:

means for determining the phase difference between a transmitted ultrasound signal and a received ultrasound signal from respective transceivers;

means for calculating the velocity of the air flow in said duct based upon said phase difference; and, wherein said rigid support assembly includes a rigid, substantially straight member spanning said duct adjacent said sensory path, said transceivers mounted at opposite ends of said member near opposing walls of said duct.

2. A combination of a duct and an air velocity detector as claimed in claim 1 wherein said rigid support assembly is mounted to interior portions of said duct via fasteners and including means for obtaining and utilizing a temperature of said air in said duct with said means for calculating air velocity.

3. A combination of a duct and an air velocity detector as claimed in claim 1 wherein said rigid support assembly includes a rigid sleeve mounted in said duct having substantially the same cross-sectional area as said duct thereby permitting unrestricted air flow therethrough, said transceivers mounted on opposing, inboard surfaces of said sleeve.

4. A combination of a duct and an air velocity detector as claimed in claim 3 wherein said transceivers are longitudinally spaced apart on opposing surfaces of said sleeve such that said sensory path diagonally passes through a volume of said duct and said sleeve.

5. A combination of a duct and an air velocity detector as claimed in claim 1 wherein said member is entirely mounted and disposed within said duct.

6. A combination of a duct and an air velocity detector as claimed in claim 5 wherein said member diagonally traverses a predetermined volume of air defined within said duct such that said transceivers are longitudinally displaced along a length of the predetermined duct volume.

7. In combination with a duct carrying air flow for heat, ventilation or air conditioning, said duct subject to significant vibrations due to environmental factors, an air velocity detector utilizing spaced apart ultrasound transceivers comprising:

a rigid support subassembly mounted in said duct, said rigid support subassembly substantially eliminating vibrations carried by said duct, said ultrasound transceivers mounted, in a spaced part relationship facing each other, on opposing end portions of said subassembly such that air, passing through said duct, crosses a sensory path laterally extending across said duct between said spaced apart transceivers;

electronic circuitry coupled to said transceivers having:

means for determining the phase difference between a transmitted ultrasound signal and a received ultrasound signal;

means for calculating the velocity of the air flow in said duct based upon said phase difference; and, wherein said rigid support assembly includes a rigid, substantially straight member spanning said duct adjacent said sensory path, said transceivers mounted at opposite ends of said member near opposing walls of said duct.

8. In combination with a duct carrying air flow for heat, ventilation or air conditioning, an air velocity detector utilizing spaced apart ultrasound transceivers comprising:

a rigid support subassembly mounted in said duct, said ultrasound transceivers mounted, in a spaced part relationship facing each other, on opposing end portions of said subassembly such that air, passing through said duct, crosses a sensory path laterally extending across said duct between said spaced apart transceivers;

electronic circuitry coupled to said transceivers having:
means for determining a representative phase difference signal between a transmitted ultrasonic signal from one transceiver and the corresponding received ultrasonic signal from the opposing transceiver;
means for calculating the velocity of the air flow in said duct based upon said representative phase difference signal; and,
wherein said rigid support assembly includes a rigid, substantially straight member spanning said duct adjacent said sensory path, said transceivers mounted at opposite ends of said member near opposing walls of said duct.

9. A combination of a duct and an air velocity detector as claimed in claim 8 wherein said electronic circuitry includes means for reversing the transmission and reception of said ultrasonic signal and wherein said means for calculating utilizes respective bi-directional phase difference signals to calculate said air velocity.

10. A method for determining air velocity in a duct carrying air flow for heat, ventilation or air conditioning utilizing spaced apart ultrasound transceivers, the method comprising the steps of:

providing a rigid support spanning a defined volume in said duct which includes multiple cross-sectional areas of said duct;

mounting said ultrasound transceivers, face to face, on opposing, laterally and longitudinally spaced apart regions of said rigid support such that a sensory path extends across and through said duct volume and said multiple cross-sectional areas between said spaced apart transceivers;

electronically obtaining a phase difference representative signal based upon a transmitted ultrasonic signal and a corresponding received ultrasonic signal; and, electronically calculating the velocity of air flow in said duct based upon said phase difference representative signal.

11. A method for determining air velocity in a duct as claimed in claim 10 including the steps of determining a temperature of said air in said duct and utilizing said temperature during the calculation of said air velocity.

12. A method for determining air velocity in a duct as claimed in claim 10 including the steps of bi-directionally transmitting ultrasonic signals between respective transceivers and comparing a phase difference representative signal obtained in one direction with a phase difference signal obtained in an opposite direction in order to calculate said air velocity.

13. A method for determining air velocity in a duct as claimed in claim 10 including the step of surrounding the periphery of said defined volume of duct with said rigid support.

14. A method for determining air velocity in a duct as claimed in claim 10 including providing said rigid support diagonally traversing said duct volume and wherein the step of mounting includes mounting said transceivers at opposite ends of said diagonally disposed rigid support.

* * * * *